Sept. 27, 1966 A. BELTRAMI 3,275,746

SIMULTANEOUS MULTIPLE TWO-WAY MULTIPLEX COMMUNICATIONS SYSTEMS

Filed Feb. 19, 1963 5 Sheets-Sheet 1

INVENTOR.

AURELIO BELTRAMI

BY

Irwin S. Thompson

ATTY.

Sept. 27, 1966 A. BELTRAMI 3,275,746

SIMULTANEOUS MULTIPLE TWO-WAY MULTIPLEX COMMUNICATIONS SYSTEMS

Filed Feb. 19, 1963 5 Sheets-Sheet 2

INVENTOR.
AURELIO BELTRAMI
BY
Irwin S. Thompson
ATTY.

Sept. 27, 1966 A. BELTRAMI 3,275,746

SIMULTANEOUS MULTIPLE TWO-WAY MULTIPLEX COMMUNICATIONS SYSTEMS

Filed Feb. 19, 1963 5 Sheets-Sheet 3

INVENTOR.
AURELIO BELTRAMI
BY Irwin S. Thompson
ATTY.

INVENTOR.
AURELIO BELTRAMI
BY
Irwin S. Thompson
ATTY.

Sept. 27, 1966 A. BELTRAMI 3,275,746
SIMULTANEOUS MULTIPLE TWO-WAY MULTIPLEX
COMMUNICATIONS SYSTEMS
Filed Feb. 19, 1963 5 Sheets-Sheet 5

INVENTOR.
AURELIO BELTRAMI
BY
Irwin S. Thompson
ATTY.

3,275,746

SIMULTANEOUS MULTIPLE TWO-WAY MULTIPLEX COMMUNICATIONS SYSTEMS

Aurelio Beltrami, Via Circo 4, Milan, Italy

Filed Feb. 19, 1963, Ser. No. 259,561
Claims priority, application Italy, Dec. 11, 1962, 29,815
1 Claim. (Cl. 178—6.8)

The present invention relates to a system of simultaneous multiple two-way multiplex transmission of video-phonic or video or phonic or telegraphic signals, or of electronic programs or data for computers, for telecontrols, or of information signals of any type.

The transmission of such signals may take place either over a wire or wires, a wave guide, or by means of a carrier wave or radiation, or coherent light.

The systems of the present invention allows the simultaneous bilateral transmission of signals between a considerable number of subscribers in one town, with as many subscribers in one or more other towns, by means of only two wires, cables or wave guides, or waves, or carrier radiations.

The systems are based on a new basic principle according to which, at the transmission station, each communication differentiates from the other not for being associated with a particular frequency, but for being associated with a particular position on a television screen with a honeycomb device or the like and, at the receiving station, the selection is effected not by means of filters, as at present, but by taking advantage of the particular relevant position of each of said communications, assigned on a television screen or the like, similar to that presented at the transmission end.

Those skilled in the art will easily understand the huge simplification afforded by these systems with respect to the multiple communication systems already known.

More precisely, an installation according to the invention includes: At every subscriber's, an equipment of any known or preferred type, and such as to allow the picking up and transformation to electrical signals of the signals of any type that it is wanted to transmit, as well as the reception of the corresponding signals coming from the called subscriber; and at the exchange of each town: as characteristic elements, that is in addition to the usual call and selection elements, one or more cathode ray tubes with very low persistence screens for the transmission, and one or more cathode ray tubes for the reception, all of these tubes being combined with particular honeycomb or cellular devices, one of which is placed in front of the screen of each of the above mentioned tubes.

Each of said cellular or honeycomb devices comprises a predetermined number of compartments or cells in each of which there is arranged an element providing for the transformation of a luminous or invisible radiation into an electric magnitude, or vice versa, for forming a composite signal comprising the signals of the different subscribers, or for separating said different signals from a composite signal received, the above mentioned elements of the different cells operating in succession, according to the development of the selected type of reticle, as they are scanned by the electronic beam that describes the adopted reticle on the screen to which each honeycomb is coupled.

Each exchange comprises also a generator for the voltages needed to form the reticle on the above mentioned cathode ray tubes. Said generator may even be of any static type, but preferably will be of the rotating type already disclosed and claimed in other patents by the same applicant. In such a case it comprises a rotating member carrying patterns or tracks, adapted to modulate the radiations striking them so as to supply, through transducers with which said tracks are combined, electric voltages of the desired shape and frequency.

Preferably every exchange will also be provided with a signal generator for supplying the reticle and commutation signals to the oscillographic equipment provided at each subscriber's device, when the transmission system comprises also the transmission of video signals.

In the following specification there will be considered the case of the transmission of video-phonic signals, which are the most complex ones. Evidently all of the equipment can be remarkably simplified when the type of signals to be transmitted are less complex, it being possible to consider all of these cases as particular instances of the system for transmitting video-phonic signals, as it will now be considered in detail.

The systems of the present invention may be realized in many different ways and with different types of honeycomb devices. In the following specification, one of said devices is coupled with a transmission system making use of wires or coaxial cables, and the other to a wireless transmission system; however nothing prevents the first embodiment of the invention from being coupled with a wireless transmission system, and the other, with a transmission system by wire.

The accompanying drawings illustrate diagrammatically some embodiments of the present invention, but of course it must be understood that such embodiments have no limiting value for the invention, but are only for illustration purposes.

In the following described embodiments of my invention I have adopted for the cathode ray tubes, reticles or fields consisting of sequentially scanned parallel lines spaced equidistantly over the whole picture area.

More precisely, in the accompanying drawings:

FIGURE 1 shows in its essential and novel parts, an exchange of a town X, forming part of a multiple transmission installation, via wire, of video-phonic signals from this exchange to other similar exchanges in other towns, wherein the transformation and transmission of said signals occurs according to a first way of embodying the present invention.

Figure 1:
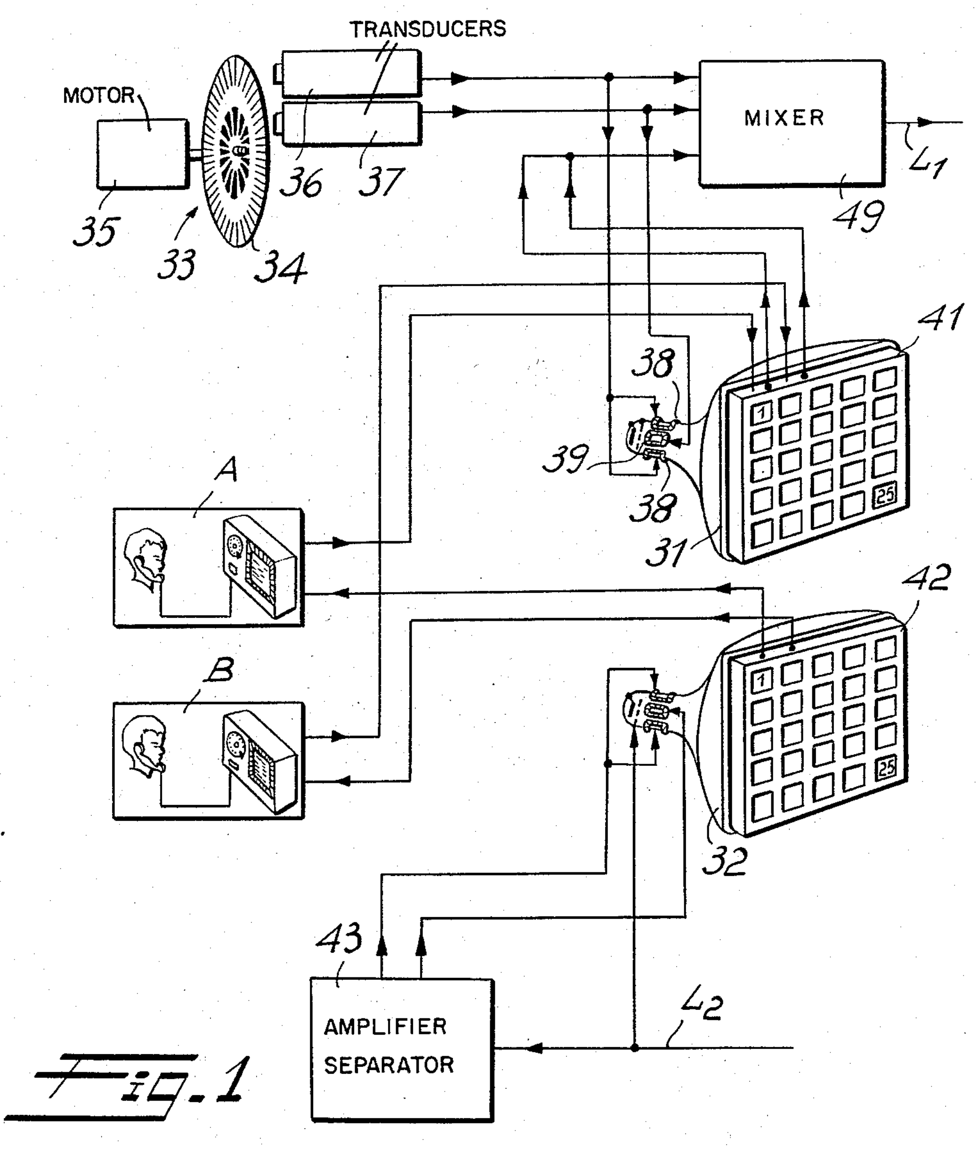
FIGURE 1 illustrates diagrammatically the characteristic elements in an exchange for the simultaneous bilateral and multiple transmission, by wire, of video-phonic communications, there also being diagrammatically shown the equipments of two of the subscribers connected with said exchange.

In said figure there are also diagrammatically shown the equipments at two of several subscribers in the town X that are designated with A and B respectively. Each of the equipment at subscriber's such as A and B allowing the transmission and reception of video-phonic signals may be of any known or preferred type; in particular, each of them may be of one of the types described and claimed in another patent of the same applicant. More exactly, in the example illustrated, there is assumed that each of said equipment comprises, in combination with the usual call and selection devices: a cathode ray tube, adapted to operate for short mutually alternated intervals, as a kinescope receiving the image of the other subscriber, and a scanning device of the figure (or other part) of the subscriber to which corresponds the equipment; a telephone hand set adapted to receive the phonic signals of the other subscriber and to transmit those of the subscriber to whom belongs said equipment; mixers or modulators to obtain a single composite signal, comprising the video and phonic portions, to be transmitted to the exchange, as well as means to generate in situ, or to separate from one another, from a composite signal arriving from the exchange, the frame frequency and the line frequency signals required to generate the field on the subscriber cathode ray tube, as well as a commutating voltage to be sent to the grid of said tube to control the alternation and succession of the above said several periods of operation of the tube. In the example as shown, it may be preferable that the three above mentioned signals, at frame frequency, at line frequency and at commutation frequency, be generated by a single rotating generator at the exchange, the signal resulting from the combination of said signals being sent from the above mentioned exchange to every one of the subscribers when they are called or are calling. For reasons of simplicity such a rotating generator is not shown in FIGURE 1, as are not shown in detail also the equipments of the subscribers A and B, inasmuch as they are already described and illustrated in other patents of the same applicant, i.e., 2,985,872 and 3,042,747. In FIGURE 1 instead, there is shown the generator of the voltages required to form the reticle or field on the cathode ray tubes combined with the honeycomb devices and provided in the exchange, as it will be better described hereinafter.

The exchange illustrated in FIGURE 1 comprises a transmitting section, formed by a cathode ray tube 31 having a very low persistence screen functioning as a transmitter, on the screen thereon there is rigidly affixed a honeycomb device 41. The receiving part of said exchange comprises another cathode ray tube 32, constituted by a conventional kinescope, and which also is combined with a honeycomb device 42 fixedly secured on the screen. The voltages to be applied to said tube 31 for forming the reticle are supplied from the rotating generator 33, comprising a disc 34, carrying two tracks, said disc being made to turn by a small synchronous motor 35, and combined with two transducers 36 and 37 respectively for transforming into electrical signals the radiations, of any suitable type, striking the tracks on the disc 34, and which are modulated by the same. In particular, the transducer 36 will supply the signals at the line frequency, and the transducer 37 those at the frame frequency, said signals being respectively applied to the two pairs of coils 38 and 39 when, as in the case illustrated, there has been adopted the magnetic deflection system for the cathode ray beam of the tube 31. In this instance, the frame frequency will preferably be of no less than 60,000 frames per second, and to this end the small motor will have to run at 500 revolutions per second and be fed at a corresponding frequency which, in the example considered, will be of 500 cycles per second.

Figures 2, 3:
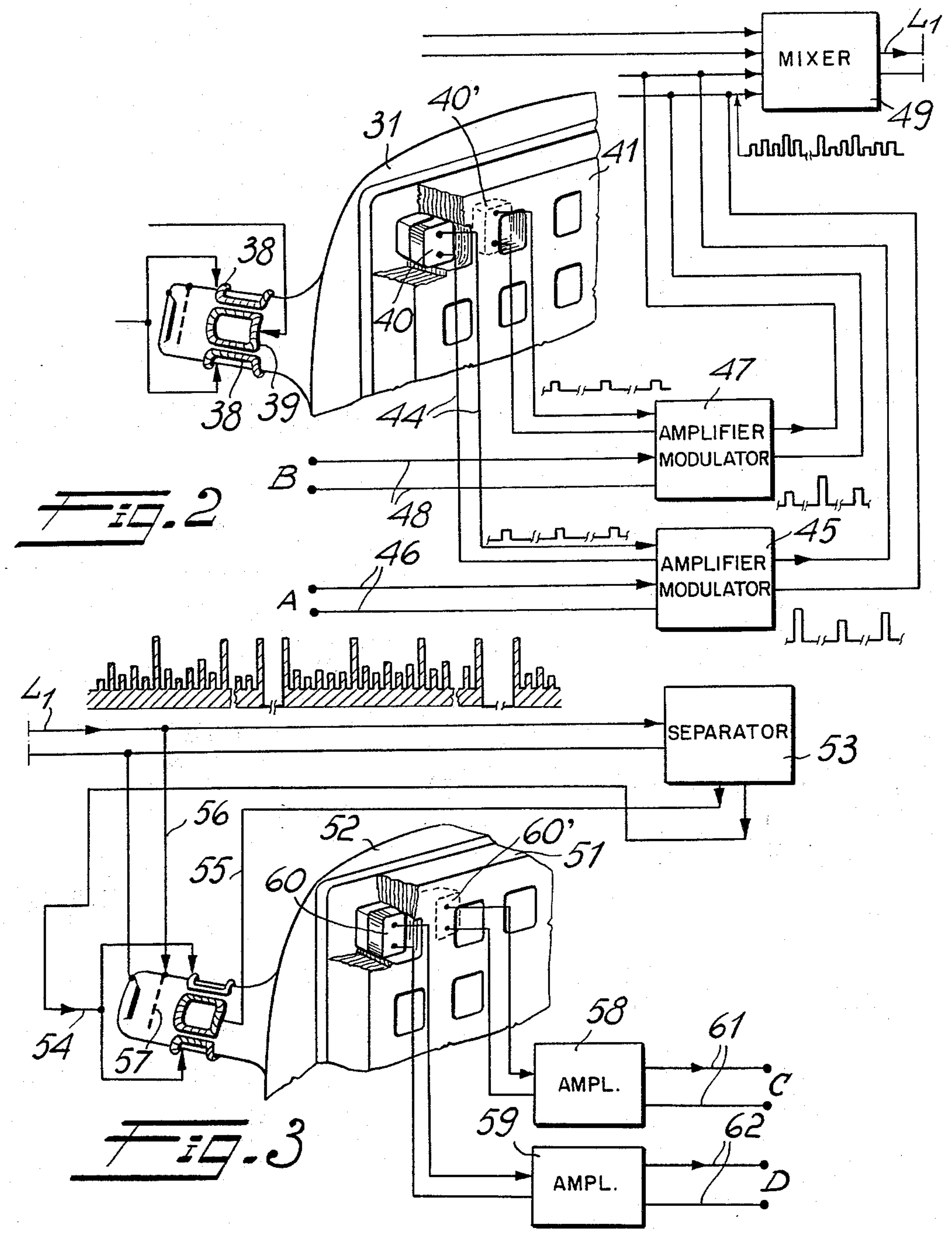
FIGURE 2 shows in detail, and on a larger scale, a portion of a transmitting cathode ray tube and the corresponding honeycomb device suitable for exchanges such as the one illustrated in FIGURE 1.
FIGURE 3 illustrates in detail, in a way similar to FIGURE 2, a portion of the receiving tube and its corresponding honeycomb device, utilized in an exchange similar to the one of FIGURE 1.

The honeycomb device 41, comprising a plurality of cells arranged in rows and columns, as the other ones in FIGURES 1, 2 and 3, is provided with 25 cells, these being numbered in successive horizontal rows from 1 to 25. Thus the cell number 1 will be the first one at the upper left corner, and the cell number 25 will be that at the lower right corner. The honeycomb device 41 comprises, in each cell, a photo-transistor (see FIG. 2) or solid state diode 40, each of which transforms to an electrical impulse the luminous energy, of constant intensity, developed by the screen of tube 31 in all of the very short time intervals in which the cathode ray beam scans the reticle in front of the cell. Thus, upon consideration of FIGURE 2, it is apparent how the luminous beam scanning the reticle on the screen of the tube 31 will strike for each field, successively, the photo-transistor or photo-diode 40 of the cell 1, and then the photo-transistor or photo-diode 40′ of the cell 2, and so on up to the cell 25, generating in the circuit of each of said photo-transistors an electric impulse, said impulses being all of the same intensity. These impulses will then be modulated by the video-phonic signals coming to the exchange from the different subscribers.

In fact, the electrical impulses in which, for instance, the diode 40 has transformed each of the passages of the uniform light beam on the screen portion of the tube 31, corresponding to the cell 1, are sent through the leads 44 to an amplifier-modulator 45 (FIGURE 2), to which, through the lead 46, is also sent the video-phonic modulating signal coming from the subscriber A when this station is calling, and connected with one subscriber in another town, for instance the subscriber C in the town Y. In FIGURE 1 it has been assumed that the modulators such as 45 and 47 have been incorporated in the honeycomb structure 41.

In a completely similar way, another amplifier-modulator 47, the same as modulator 45, will modulate the electrical impulses sent from the diode 40′ in the cell 2 with the video-phonic signal generated by the equipment of subscriber B, when this last station also is calling; said signals are transmitted to the amplifier-modulator 47 through the leads 48. At the side of the leads 44 and 46, as well as of the other leads in FIGURE 2, there are diagrammatically shown on the drawing the shape of the signal passing through said leads. The outputs of the two amplifier-modulators 45 and 47 are supplied to the mixer 49 that provides the reception in the correct sequence of the signals coming from the twenty-five cells of the honeycomb device 41 placed in front of the cathode ray tube 31, and the mixing thereof with the line and the frame signals generated by the generator 33. The composite signal at the output of the mixer 49 is sent through a single line $L_1$ to the exchange of the town Y, on which are branched the subscribers C and D, with whom the subscribers A and B of the town X are being respectively connected.

In FIGURE 3 there is illustarted in detail a portion of the receiving tube or kinescope of the exchange in the town Y, where the above mentioned signals are arriving. Said tube has been designated with 52 in FIGURE 3, and is in all details similar to the tube 42 of the exchange in the town X, illustrated in FIGURE 1. The receiving section of each exchange, such as those of the above considered towns X and Y, comprises: a separator 53 that separates the line and frame signals from the signals transmitted by the twenty-five cells of the transmitting honeycomb structure, such as that designated as 41, considered above; the line and frame signals are then sent respectively, by means of the leads 54 and 55, to the deflecting coils of the tube 52, while the whole composite signal arriving on the line $L_1$ is being sent through the lead 56 to the modulating grid 57 of the cathode ray tube or kinescope 52.

Because of the above mentioned modulation applied on the grid 57 of the receiving tube 52, the luminous beam that will travel on the screen of said tube will not have a constant intensity, as it was the case of the transmission tube 31, but will have a variable intensity, in relation to the higher or lesser modulation depth of the impulses, said modulation being due to the video-phonic signals coming from each of the cells of the transmitting honeycomb structure. Now, since the two fields on the screens of the receiving tube 52, and of the transmitting tube 31 considered above, are in perfect synchronism and perfect phase correspondence, the luminous intensity of the beam on the screen of the tube 52, when this beam passes in front of the cell 1, will correspond to the signal transmitted by the cell 1 of the transmitting tube 31, and so on for all the other cells up to the 25th, and for all the successive reticles or fields described by the electronic beam on the screen of the tube 31. Thereby, the phototransistor, such as those designated with 60 and 60′ in FIGURE 3, corresponding to the cells 1 and 2 of the honeycomb structure 51 of the receiving tube 52 of the exchange in the town Y, will transform said luminous impulses to electric signals that will be respectively sent, if necessary, to amplifiers such as those designated with 58 and 59, and then, through the leads 61 and 62, will be sent respectively to the equipment of the subscriber C and to that of the subscriber D, with whom the subscribers A and B of the town X wanted respectively to communicate.

Simultaneously the video-phonic signals generated by the subscribers C and D of the town Y, over the respective subscriber equipments, will be sent to the transmitting tube of the exchange of town Y, perfectly similar to the transmitting tube 31 of the exchange of the town X, and will arrive, as it has been previously described, with reference to FIGURES 2 and 3, over a second wire or cable $L_2$, to the receiving tube 32 of the town X, where they will be separated, as already stated while describing FIGURE 3; the composite video-phonic signal will be sent to modulate the beam of tube 32, the honeycomb structure whereof 42 will transform the individual luminous signals of each cell to electrical signals that will be sent to the respective subscribers of the town X.

From the above description it will be apparent that with two simple lines, i.e. with the line $L_1$, connecting the transmitter of the exchange of the town X with the receiver of the town Y, and the line $L_2$, connecting the transmitter of the town Y with the receiver of the town X, it is possible to simultaneously transmit as many bilateral communications as there are cells in each of the honeycomb structures combined at each exchange with the screens of the cathode ray tubes, respectively transmitting and receiving.

Of course the connection between each calling subscriber, such as those designated A and B in the town X, and the called subscribers, such as those C and D of the town Y may be effected either with the manual system or with a semi-automatic or fully automatic system.

It is understood that, when an exchange as X has the capacity to communicate with many similar exchanges, the same will comprise one or more pairs of tubes, such as those indicated with 31 and 32 (FIGURE 1), as many as there are exchanges of the localities with which it is foreseen that the first exchange may have to communicate, and there will be as many pairs of wires or cables, such as $L_1$ and $L_2$, as there are exchanges with which the X exchange considered has the capacity to communicate.

In order that the reception occurs with acceptable distortions it is necessary that, as already mentioned above, the frame frequency be higher than the maximum frequency contained in the band to be transmitted. If, for instance, the video-phonic signal of each subscriber corresponds to 50 lines and 25 frames per second, it is necessary that the frame frequency on the oscillographic tubes combined with the honeycomb structures be in excess of 30 kilocycles. If instead the signal were only phonic, that is in the case of multiple telephone traffic, the number of frames per second to be transmitted shall be not less than 5000.

A different way to realize the present invention is illustrated in the FIGURES 4, 5, 6 and 7 of the accompanying drawings where the composite signal resulting at the output of the transmitting section of each exchange is transmitted to the exchange of another town via radio, that is, by means of a carrier wave. Even in this case, there will suffice only two carrier waves for transmitting a number, even very high, of separate signals, that are of simultaneous bilateral communications between pairs of subscribers.

Figure 4:
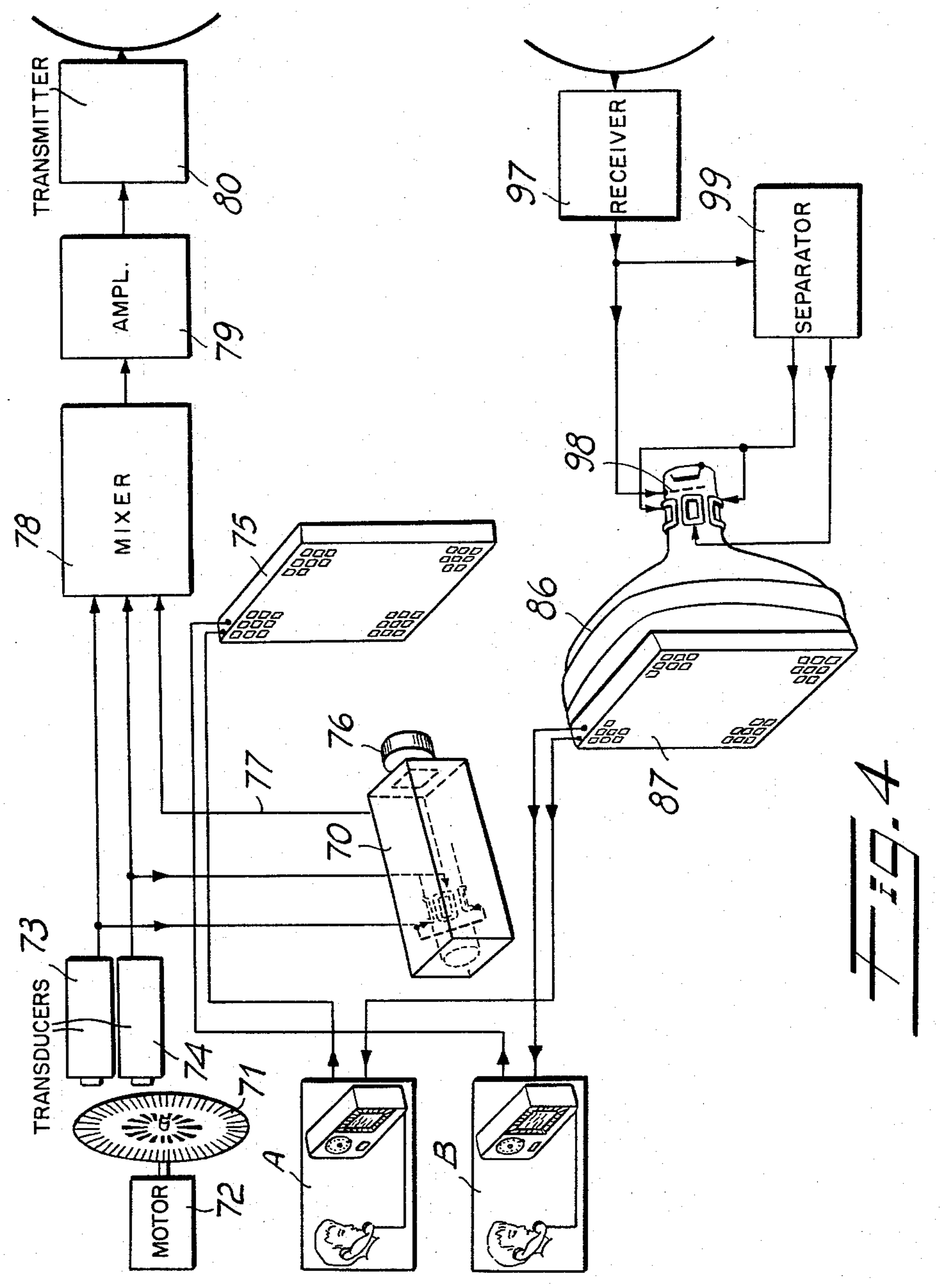
FIGURE 4 illustrates diagrammatically and in perspective the characteristic elements of an exchange for video-phonic transmissions according to another embodiment of the present invention, wherein also are shown two of the subscriber devices connected with the exchange.
Figure 5:
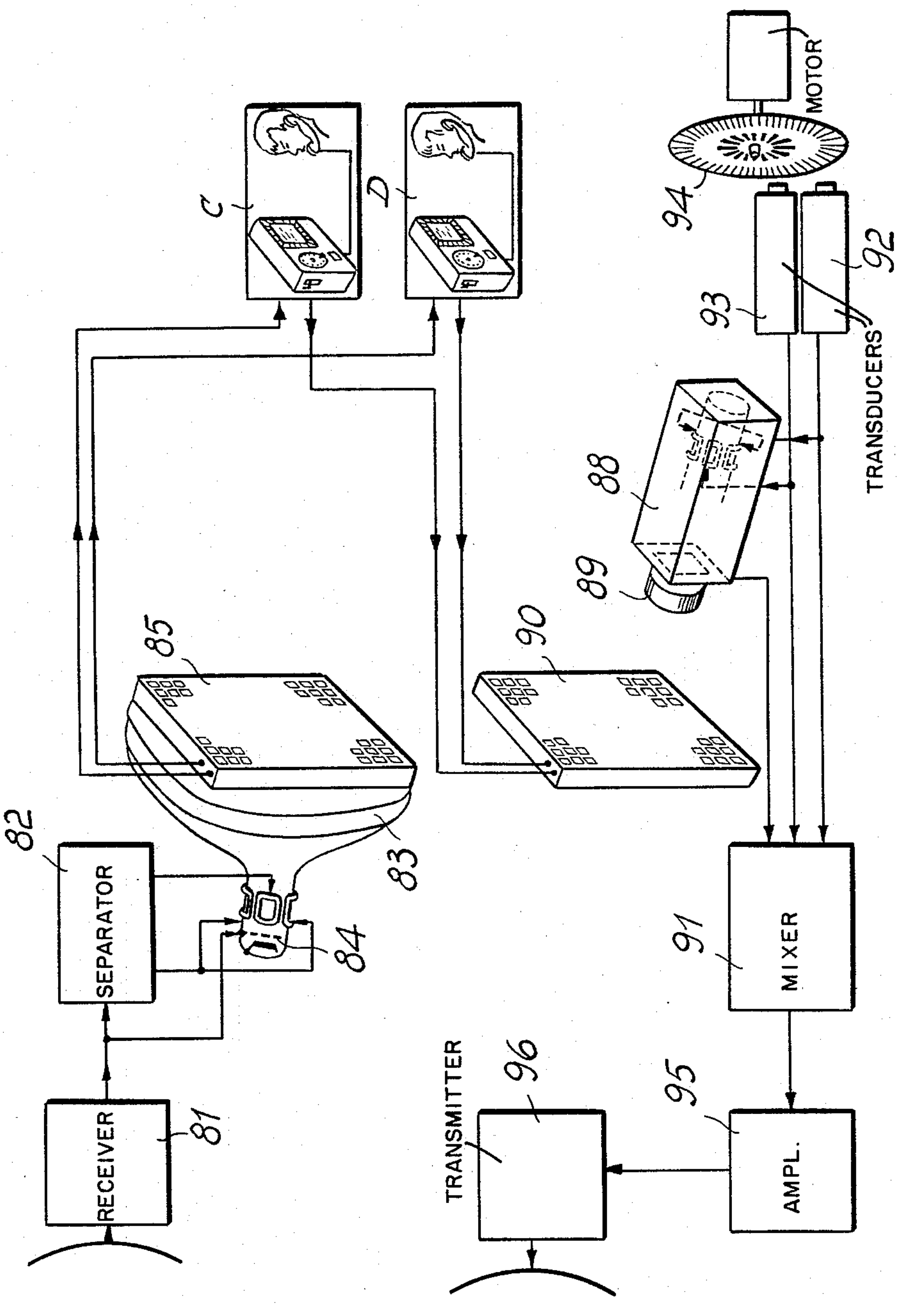
FIGURE 5 illustrates, in a way similar to FIGURE 4, the exchange of another town, with which the exchange of FIGURE 4 can communicate via radio to effect the connections between any of the subscribers in the first town and any of the subscribers in the second town.

In the example, as illustrated in the FIGURES 4 and 5 of the drawings, of this second embodiment of the invention, there is provided in the exchange of each town; a transmission tube of the storage camera type, rigidly combined, as in the preceding case, with a suitable honeycomb structure, and, for receiving purposes, a kinescope, also rigidly combined with its respective honeycomb structure. In FIGURE 4 there is indicated with 70 the camera pickup transmission tube in which the field or reticle is generated by means of the usual two voltages, respectively at the line frequency and at the frame frequency, even in this instance generated by a rotating generator, comprising a disc 71 carrying the tracks. Said disc is driven by a small motor 72, each of the two tracks carried by the disc 71 being combined with a transducer, respectively 73 and 74, that transfers the modulated radiations supplied by the tracks carried on the disc 71 to electric voltages of the frequency and shape required to form the wanted reticle on the camera pickup screen of the tube 70. Said tube is combined with a honeycomb structure 75, in a fixed position relative to the screen of the above mentioned tube. In this case, the honeycomb structure has a number of cells by far much higher than that considered in the preceding instance, and each cell thereof comprises an element adapted to transform into a luminous quantity the variable intensity electric signal coming from one of the subscribers connected with the exchange, calling a subscriber in another town. As it can be seen in FIGURE 4, where with A and B there are shown the equipments of two of the subscribers connected with the exchange of FIGURE 4, the composite video-phonic signal at the output of the equipment of the subscriber A is being sent to one of the cells of the honeycomb structure 75, and similarly it happens for the signal supplied from the equipment of the subscriber B that is being sent to another cell of the same honeycomb structure 75.

The honeycomb structure 75 will thus provide, when the exchange is in full operation, a series of horizontal rows of cells luminous with variable light intensity in accordance with the electric signal that each cell receives from the respective subscriber, and the transmission to another exchange, for instance that of the town Y (FIGURE 5), will take place through the simple television transmission of the image of the honeycomb structure 75.

Indeed, the pick-up tube 70 (FIGURE 4) combined with the lens 76, scans with its electronic beam the honeycomb structure in a rigorously fixed position relative to the screen of the tube 70 and the electric signals supplied from said camera tube are supplied through the lead 77 to a device 78, mixer of the above mentioned video-signals with the line frequency and frame frequency signals coming from the transducers 73 and 74 of the rotating generator. The composite signal coming from 78, amplified, in the case shown, by means of the amplifier 79, is being sent to the radio-transmitter 80, where a selected frequency carrier wave is modulated by said signal.

In the exchange of the town Y (FIGURE 5) there will be a radio-receiver 81, followed by a separator 82 for separating the line and the frame signals from the video signal. Said line and frame signals are sent to the deflection coils of the receiving cathode ray tube, or kinescope 83, while the complete signal, containing the video signal is supplied to modulate the grid 84 of the tube. In front of the kinescope 83 screen there is mounted, in a rigidly predetermined position, a honeycomb structure 85 that will have a number of cells exactly equal to that of the honeycomb structure 75. The size, shape and the structure of each of said cells will be equal or exactly proportional to those of the cells forming the honeycomb structure 75.

In each of said cells there is positioned, as in the case of the FIGURES 1, 2 and 3, a solid state diode or phototransistor that will transform to electric signals the variations of luminous intensity that will occur on that portion of the tube 83 screen by effect of the signal emitted by the subscriber coupled with the corresponding cell of the honeycomb structure 75. From each cell of the honeycomb 85 there will branch leads that, through the combination means of the exchange, may be connected to the different subscribers called at the town Y. In particular, in the instance as illustrated, where it has been assumed that the two subscribers A and B of the town X want to communicate with two subscribers, C and D respectively, of the town Y, the two cells considered of the honeycomb structure 85 will in fact send signals respectively to the two subscribers C and D.

The town X exchange is provided in turn with a kinescope 86, combined with a honeycomb structure 87, the cells whereof will each be capable of being connected with one of the subscribers of the town X, and in particular, for the two cells considered in the example shown in said figures, the first two cells on the top left side will be connected respectively with the subscriber A and the subscriber B. These subscribers will thus be able to simultaneously transmit their conversation and their image, and receive the phonic and video signals coming respectively from the subscribers C and D of the town Y.

To this end even the town Y exchange will be provided with a storage camera transmitting tube 88, practically equal to the tube 70 of FIGURE 4, provided with a lens 89 and rigidly combined with a honeycomb structure 90, perfectly equal to the honeycomb structure 75 of FIGURE 4, and to the cells whereof there will arrive the signal coming from the subscribers of the town Y. Said signals will be transformed to luminous radiations by the luminescent gas lamps provided in the cells of the honeycomb structure 90, and the image of said honeycomb structure will be picked up by the camera tube 88 combined with the lens 89. The electric signals of the output of the device 88 will be mixed in the mixing circuit 91 with the line frequency and frame frequency signals coming from the two transducers 92 and 93 of a rotating generator, comprising also a rotating disc 94 carrying the tracks. Said generator is similar to the generator already described in connection with FIGURE 4, and comprising the disc 71 driven by the small motor 72 and the transducers 73 and 74.

The composite signal at the output from the mixer 91, amplified in the amplifier 95, is being sent to the radio transmitter 96 where a carrier wave at a frequency, different from the one previously considered, will be modulated with the signal supplied by the amplifier 95.

At the exchange of FIGURE 4, the receiving section comprises, besides the kinescope 86 and the honeycomb 87, the radio-receiver 97, similar to the radio-receiver 81 of FIGURE 5, and the signal demodulated by this radio-receiver will be sent to modulate the grid 98 of the kinescope 86, as well as to the separator 99 that will provide the separation of the video signal from the line frequency and frame frequency signals, which last ones will be sent to the deflection coils of the tube 86. The honeycomb structure 87, arranged in a fixed position in front of the kinescope 86 screen will have in each cell a phototransistor that will transform to an electric magnitude the luminous intensity variations of the honeycomb device 87 in front of the tube 86 limited by the walls of the cell.

Such electric signals will be sent, as can be clearly seen in FIGURE 4, to the subscribers A and B of the town X. There is thus obtained the simultaneous bilateral multiple transmission of the video-phonic signals between subscribers of the town X and subscribers of the town Y.

Of course, each of the honeycomb structures 75, 87, 85 and 90 will have to be rigidly connected, in a predetermined fixed relation, to the respective cathode ray tubes, in order to insure a perfect operation of the system. Even in this case, due to the rigid and fixed connection between honeycomb structure and respective pick-up tube, there will be the certainty that the luminous beam of the respective cathode ray tube will pass in front of the cell 1, for instance, of the receiving honeycomb at the instant in which it receives the modulation due to the signal coming from the cell 1 of the corresponding honeycomb structure of the transmitting section of the exchange of the other town. And of course this cycle repeats itself for all and each of the different cells.

Figures 6, 7:
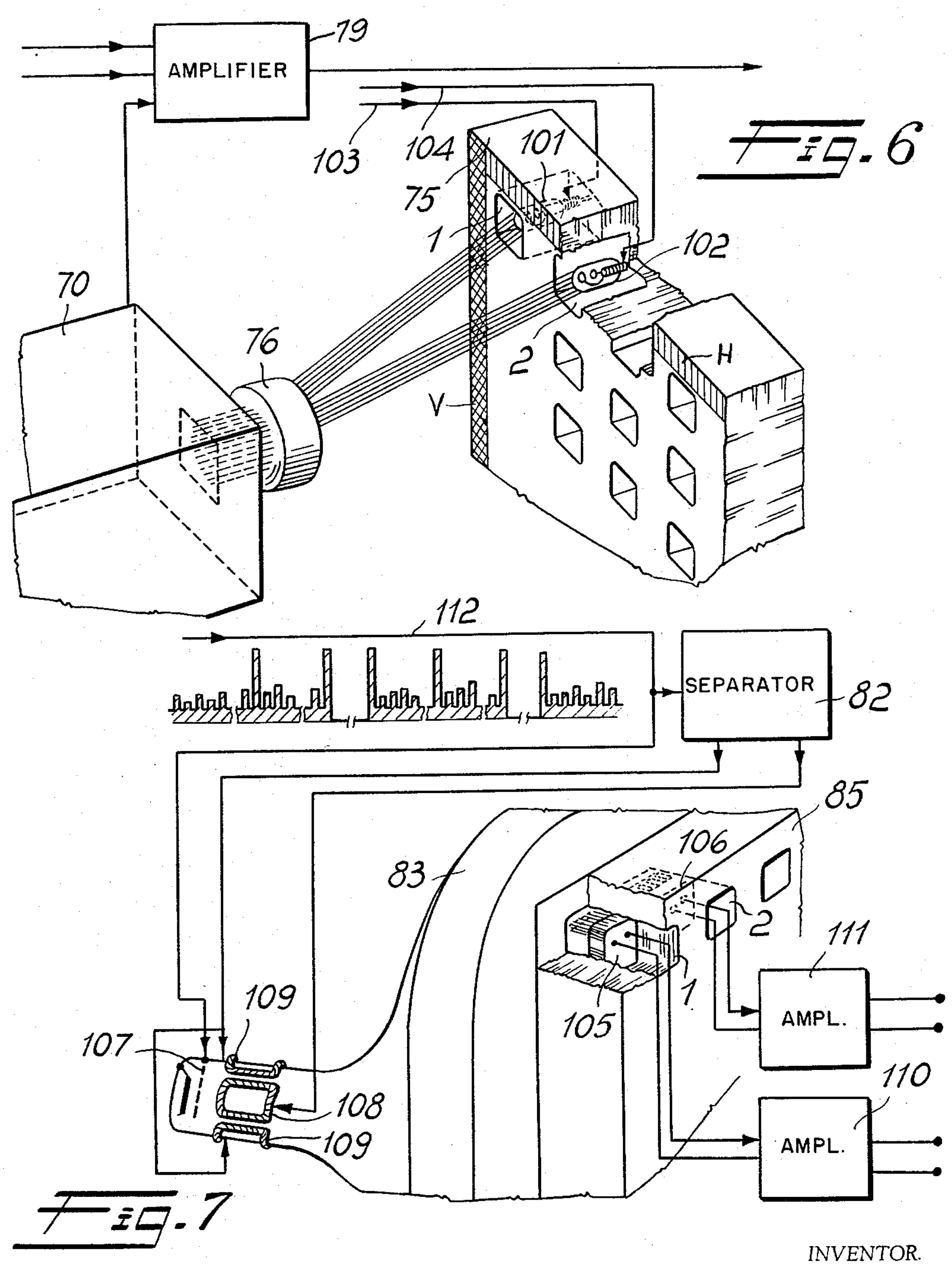
FIGURE 6 illustrates in detail, diagrammatically and on a larger scale, a portion of the camera equipment for transmitting the video-phonic signals from the different subscribers, branched on the exchange of FIGURE 4.
FIGURE 7 illustrates in detail and diagrammatically a portion of the receiving tube and of the honeycomb device connected to same, for receiving the signals transmitted by a transmitter such as the one of FIGURE 6.

In FIGURE 6 there are illustrated, on a larger scale and more in detail, a portion of the camera tube 70, and a portion of the honeycomb structure 75, in order to provide a better understanding of the invention. In particular it can be seen as in the cell 1 of the honeycomb structure 75, there is located a small luminescent gas electric lamp 101, fed by the electric signals coming through the lead 103 from the subscriber A, while in the cell 2 of said honeycomb there is placed another lamp 102, fed through the lead 104 with the signals coming from the subscriber B. It is then apparent how each of these lamps will be at each instant differently luminous according to the intensity of the signal that in said instant arrives from the respective subscriber, whereby these luminosity variations will exactly correspond to the respective signals as generated by the video phonic signals of each subscriber, and therefore the transmission of the image of this honeycomb structure with the system of the television scanning will allow the simultaneous transmission of a very high number of simultaneous bilateral communications between exchanges.

This second embodiment of the invention allows a further simplification inasmuch as it is possible to eliminate the mixers such as 78 and 91, respectively, of the exchanges of FIGURES 4 and 5, since the line frequency and frame frequency signals to be transmitted with the video signals can be automatically generated through the scanning of the front of the honeycomb structure (75 or 90) suitably prearranged to this end.

In fact, to this end, it will suffice that the front of the honeycomb structure presents a vertical stripe V on its right end or on its left end edge, covered with paint or other material such as to give rise to a reflection of visible or invisible radiations of an intensity remarkably different from that of the other vertical stripes limiting the different cells of the honeycomb. It is then apparent how such a stripe, which will be scanned at the end or at the beginning of each line of the reticle described by the scanning beam of the camera tube (such as 70 or 88 in the drawings), generates in the signal coming from said camera tube and containing the video signals a line frequency signal.

By further providing on the top or bottom horizontal edge of the honeycomb structure front another stripe H having a reflecting power distinctly different from that of the vertical stripe considered above, there will be obtained in the signal supplied from the above mentioned camera tube also a frame frequency signal of an amplitude different from that of the line signal due to the scanning that the cathode beam will effect also of this stripe, inasmuch as it pertains to the image projected on the camera tube target at the end or at the beginning of each frame of the reticle.

Then, the signal coming out of the camera tube will already contain three signals; video, line frequency and frame frequency, and will be applied directly or through an amplifier to modulate the carrier wave of the respective radio-transmitter.

In FIGURE 7 there is illustrated, in detail and at a larger scale, a portion of the receiving tube 83 as well as of the corresponding honeycomb structure 85. As it can be seen, to the grid 107 of the tube 83 there is supplied the composite video-phonic signal coming from the exchange of the town X, while to the deflection coils 108 and 109 of said tube are supplied respectively the frame signals and the line signals, also transmitted from the exchange of the town X, and separated from one another and from the video signals by the separator 82 already described with reference to FIGURE 5. In the cell 1 of the honeycomb structure 85, there is here clearly shown how there is arranged therein a phototransistor 105, which transforms to electrical signals the luminosity variations of the corresponding portion of the tube 83 screen luminosity variations that corresponds to the videophonic signals of the subscriber A. The electric signal coming out of the phototransistor 105, if necessary, are amplified by an amplifier 110, and supplied to the subscriber C. In a perfectly identical way operates the phototransistor 106, located in the cell 2 of the honeycomb structure 85, the electric signal coming out from same, after amplification through the amplifier 111, will be supplied to the subscriber D with whom the subscriber B of the town X was communicating.

On the portion 112 of the lead (FIGURE 7) coming from the radio-receiver 81 of the town Y exchange (FIGURE 5), there is diagrammatically shown the shape of the composite signal that same transmits both to the modulating grid 107 of the tube 83 and to the separator 82.

As it has already been stated previously, this second embodiment of the invention comprising honeycomb structures such as those designated with 75 or 90 in the FIGURES 4 and 5, provided with luminescent gas electric lamps, could also be combined with a transmission system through a physical support, while a wireless transmission system could very easily be combined with the first embodiment of the invention, as illustrated in the FIGURES 1, 2 and 3, and comprising only honeycomb structures provided with phototransistors.

Of course the details of each of the devices illustrated in the drawing and described above, the type of the same, in particular the type of cathode ray tubes adopted, and the ways of realization of the honeycomb or cellular structures (that may have cells of any shape and material) may vary according to needs without departing from the concept of the present invention. Thus, the cathode ray tubes may also have an invisible light emission. In particular the exchanges that can be connected to one another may be more than two and each exchange may have any number of pairs of transmitting and receiving tubes. It will be easily understood by those skilled in the art that many modifications of the described embodiments of the invention may be made without departing from the spirit of my invention or the scope of the appended claim.

I claim:

In a simultaneous multiple two-way multiplex communication system for the transmission of intelligence, a system comprising a plurality of subscriber stations including transmitting and receiving equipments, an exchange for each group of subscribers with the capacity for transmitting and receiving signals from the remaining exchanges, said exchanges further comprising a transmitting honeycomb device with which each exchange subscriber is connected, a vertical and a horizontal stripe on each said transmitting honeycomb device, said honeycomb device comprising a plurality of cells arranged in rows and columns, a gas lamp in each said cell, a camera tube for scanning said honeycomb device and for producing line and frame frequency signals from said stripes, an amplifier connected to said camera tube, a transmitter connected to said amplifier for propagating signals to each of the other exchanges, a receiver for receiving signals from each of said other exchanges, a receiving cathode ray tube device, a receiving honeycomb device affixed to said receiving tube and connected to the several subscriber equipments, said receiving honeycomb device including a plurality of cells, a phototransistor in each said cell, and amplifiers connected between each said receiving honeycomb cells and said subscriber equipment.

References Cited by the Examiner

UNITED STATES PATENTS

| | | | |
|---|---|---|---|
| 2,191,565 | 2/1940 | Henroteau | 178—5.6 X |
| 2,608,617 | 8/1952 | Affel et al. | 178—6 |
| 2,730,708 | 1/1956 | McNaney | 250—219.4 X |
| 2,895,005 | 7/1959 | Kock et al. | 179—15.55 |
| 2,934,673 | 4/1960 | MacGrigg | 178—6.6 |
| 2,941,074 | 6/1960 | K. M. Poole | 328—231 |
| 3,026,417 | 3/1962 | Tomlinson | 250—219.4 X |
| 3,082,293 | 3/1963 | Johnson et al. | 178—6.6 |
| 3,084,222 | 4/1963 | Foot et al. | 179—15 |

OTHER REFERENCES

Stuckert, P. E.: Electro-Optical Pulse Generator IBM Technical Disclosure Bulletin, vol. 4, No. 10, March 1962, pp. 47–48.

DAVID G. REDINBAUGH, *Primary Examiner.*

J. A. ORSINO, T. G. KEOUGH, *Assistant Examiners.*